US010038676B2

(12) United States Patent
Khalid et al.

(10) Patent No.: US 10,038,676 B2
(45) Date of Patent: Jul. 31, 2018

(54) CALL ENCRYPTION SYSTEMS AND METHODS

(71) Applicant: Verizon Patent and Licensing Inc., Arlington, VA (US)

(72) Inventors: Mohammad Raheel Khalid, Budd Lake, NJ (US); Manuel Enrique Caceres, Basking Ridge, NJ (US); Mauricio Pati Caldeira de Andrada, South Plainfield, NJ (US); Paul Berman, Roselle Park, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/382,424

(22) Filed: Dec. 16, 2016

(65) Prior Publication Data
US 2017/0099274 A1    Apr. 6, 2017

Related U.S. Application Data

(63) Continuation of application No. 14/734,939, filed on Jun. 9, 2015, now Pat. No. 9,571,475.

(51) Int. Cl.
| | |
|---|---|
| *H04L 9/32* | (2006.01) |
| *H04L 29/06* | (2006.01) |
| *H04L 9/08* | (2006.01) |
| *H04M 3/22* | (2006.01) |
| *H04W 12/04* | (2009.01) |
| *H04W 12/02* | (2009.01) |

(52) U.S. Cl.
CPC ........ *H04L 63/0492* (2013.01); *H04L 9/0816* (2013.01); *H04L 9/0819* (2013.01);
(Continued)

(58) Field of Classification Search
CPC ..................................................... H04L 63/061
(Continued)

(56) References Cited

U.S. PATENT DOCUMENTS 6,058,187 A * 5/2000 Chen ..................... H04L 29/06
380/255
6,169,805 B1    1/2001 Dunn et al.
(Continued)

FOREIGN PATENT DOCUMENTS

WO      2008/129546      10/2008
WO      WO 2014137343 A1 *  9/2014    ......... H04L 63/0471

OTHER PUBLICATIONS

Li, et al., "A Supraliminal Channel in a Wireless Phone Application", MM & Sec '09, pp. 151-154, Sep. 7-8, 2009, Princeton, New Jersey, USA.

*Primary Examiner* — Christopher J Brown

(57) ABSTRACT

Techniques described herein may be used to encrypt a telephone call between users. User devices (e.g., smart phones) may be connected to encryption relay devices that operate as relays between headsets worn by the user and the user devices. As information passes from the headset toward a corresponding user device, an encryption relay device may encrypt the information before the information reaches the user device so that the user device transmits encrypted call information to the other user participating in the call. When encrypted information is received, and travels from the user device to the headset, the encryption relay device may decrypt the information before it reaches the headset. Thus, the techniques described herein provide an end-to-end encryption solution to telephone calls.

20 Claims, 9 Drawing Sheets

(52) U.S. Cl.
CPC ........ *H04L 9/0841* (2013.01); *H04L 63/0471* (2013.01); *H04M 3/2281* (2013.01); *H04W 12/02* (2013.01); *H04W 12/04* (2013.01); *G06F 2221/2133* (2013.01); *H04L 2209/80* (2013.01)

(58) Field of Classification Search
USPC ........................................................ 713/171
See application file for complete search history.

(56) References Cited

U.S. PATENT DOCUMENTS

| | | | |
|---|---|---|---|
| 7,107,242 B1* | 9/2006 | Vasil | G06Q 20/10 705/35 |
| 8,094,597 B1* | 1/2012 | Chhabra | H04W 52/0235 370/311 |
| 2007/0028112 A1* | 2/2007 | Mackelden | H04L 9/0894 713/176 |
| 2008/0162937 A1 | 7/2008 | Kohlenberg et al. | |
| 2010/0062744 A1* | 3/2010 | Ibrahim | G06F 11/1464 455/411 |
| 2011/0072279 A1* | 3/2011 | Milliken | G06F 21/71 713/194 |
| 2011/0238192 A1* | 9/2011 | Shah | G10L 19/018 700/94 |
| 2013/0205386 A1* | 8/2013 | Thompson | G06F 21/31 726/17 |
| 2015/0244472 A1* | 8/2015 | Poppe | H04B 11/00 367/135 |

* cited by examiner

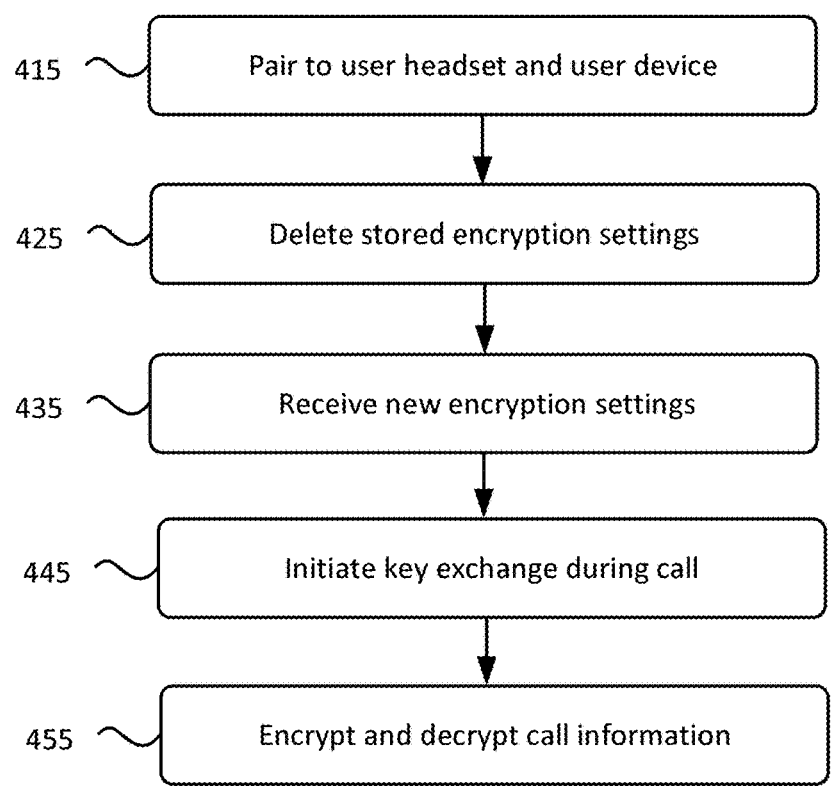

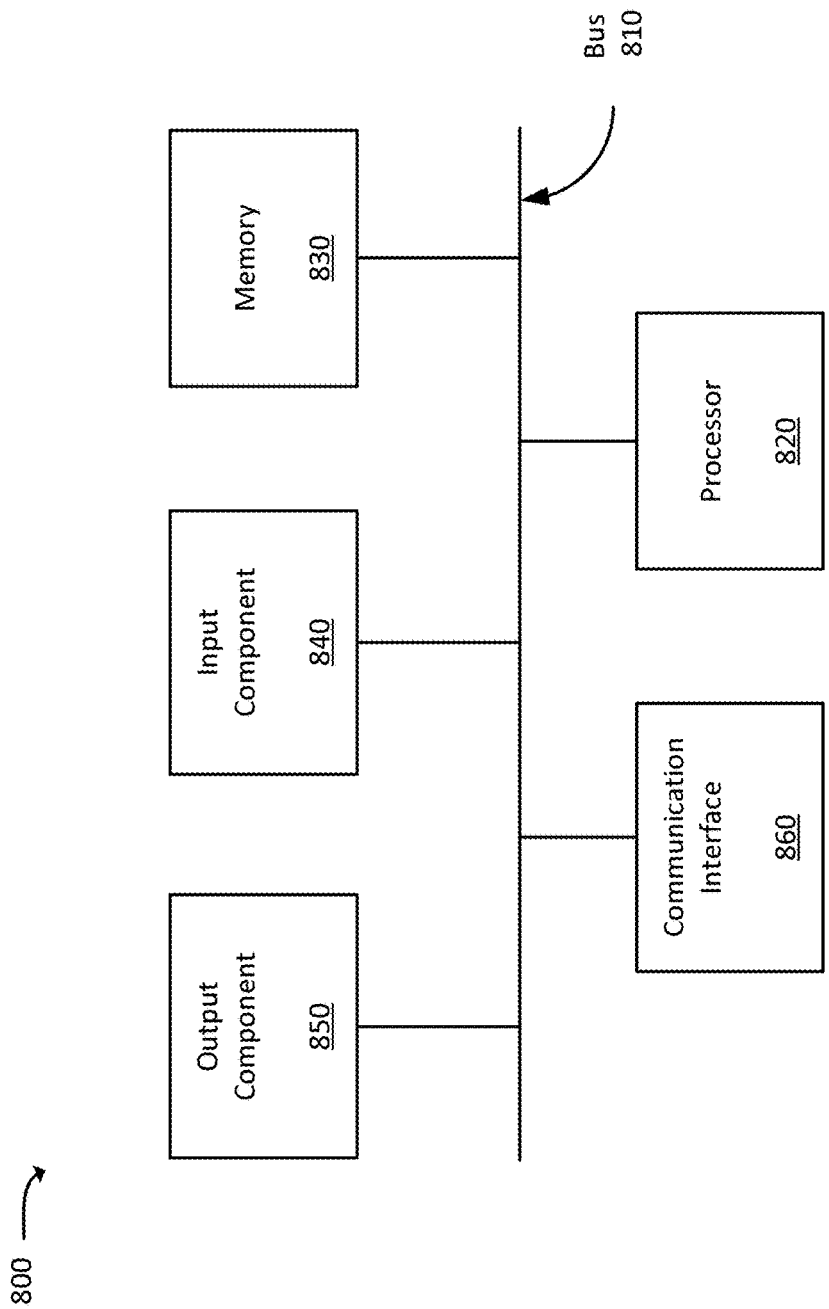

CALL ENCRYPTION SYSTEMS AND METHODS

CROSS-REFERENCE TO RELATED APPLICATION

This application is a continuation of co-pending U.S. patent application Ser. No. 14/734,939, titled "CALL ENCRYPTION SYSTEMS AND METHODS," filed Jun. 9, 2015, the contents of which are incorporated herein in their entirety.

BACKGROUND

Privacy and security are pervasive issue in many networks and telecommunication systems. In some instances, inadequate security practices can make calls and other communications vulnerable to security issues, such as wiretapping or so-called man-in-the-middle attacks (where a third party listens in on a call by covertly acting as a relay between the communicating parties).

BRIEF DESCRIPTION OF THE DRAWINGS

Embodiments of the present invention will be readily understood by the following detailed description in conjunction with the accompanying drawings. To facilitate this description, like reference numerals may designate like structural elements. Embodiments of the invention are illustrated by way of example and not by way of limitation in the figures of the accompanying drawings.

FIG. 4B is a flow chart illustrating another example process for encrypting and decrypting a call;

FIG. 8 is a diagram of example components of a device.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the present invention is defined by the appended claims and their equivalents.

Techniques described herein may be used to encrypt a call between users. User devices of each user (e.g., smart phones) may be connected to encryption relay devices that operate as a relay between the user devices and headsets worn by the users. As information passes from the headset of the first user to the encryption relay device of the first user, the information may be encrypted before it is relayed to the user device of the first user. The user device of the first user may then communicate the encrypted information to the user device of the second user. When the user device of the second user receives the encrypted information, the user device of the second user may forward the information to the encryption relay device of the second user, and the encryption relay device of the second user may decrypt the information before relaying it to the headset of the second user. As such, systems and methods described herein may enhance privacy and security by providing a solution for encrypting calls.

Figure 1:
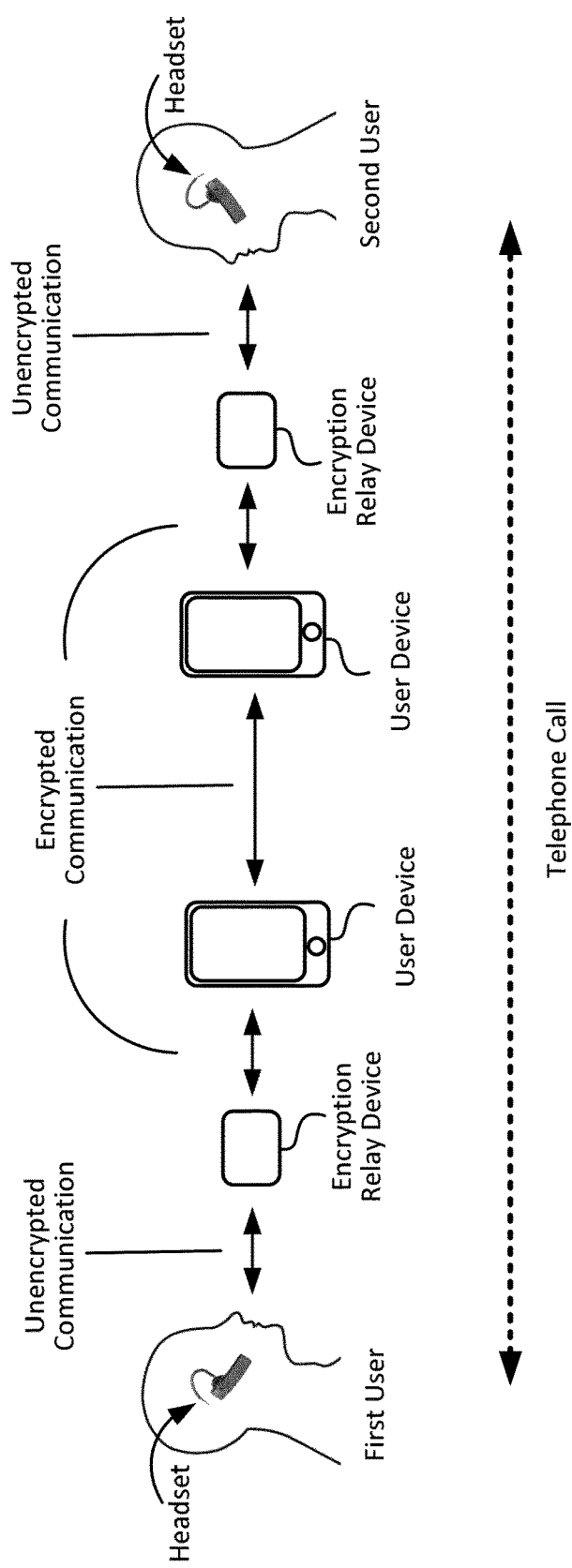
FIG. 1 illustrates an example overview of an implementation described herein.

FIG. 1 illustrates an example overview of an implementation described herein. As shown in FIG. 1, a first user may engage in a call with a second user. As the first user speaks into his or her headset, the headset may communicate the information to an encryption relay device. The encryption relay device may encrypt the information and relay the encrypted information to the user device of the first user. The user device of the first user may then communicate the encrypted information to the user device of the second user (e.g., via a wireless telecommunications network). Upon receiving the encrypted information, the user device of the second user may forward the encrypted information to the encryption relay device of the second user. The encryption relay device may decrypt the encrypted information and relay the unencrypted information to the headset of the second user. In this manner, encryption relay devices may be used to ensure that a telephone conversation is encrypted from the moment one user speaks until the moment it is heard by the other user. As such, third parties that may try to listen in on the call will only hear static and noise, whereas the users will experience a completely normal communication experience.

Figure 2:
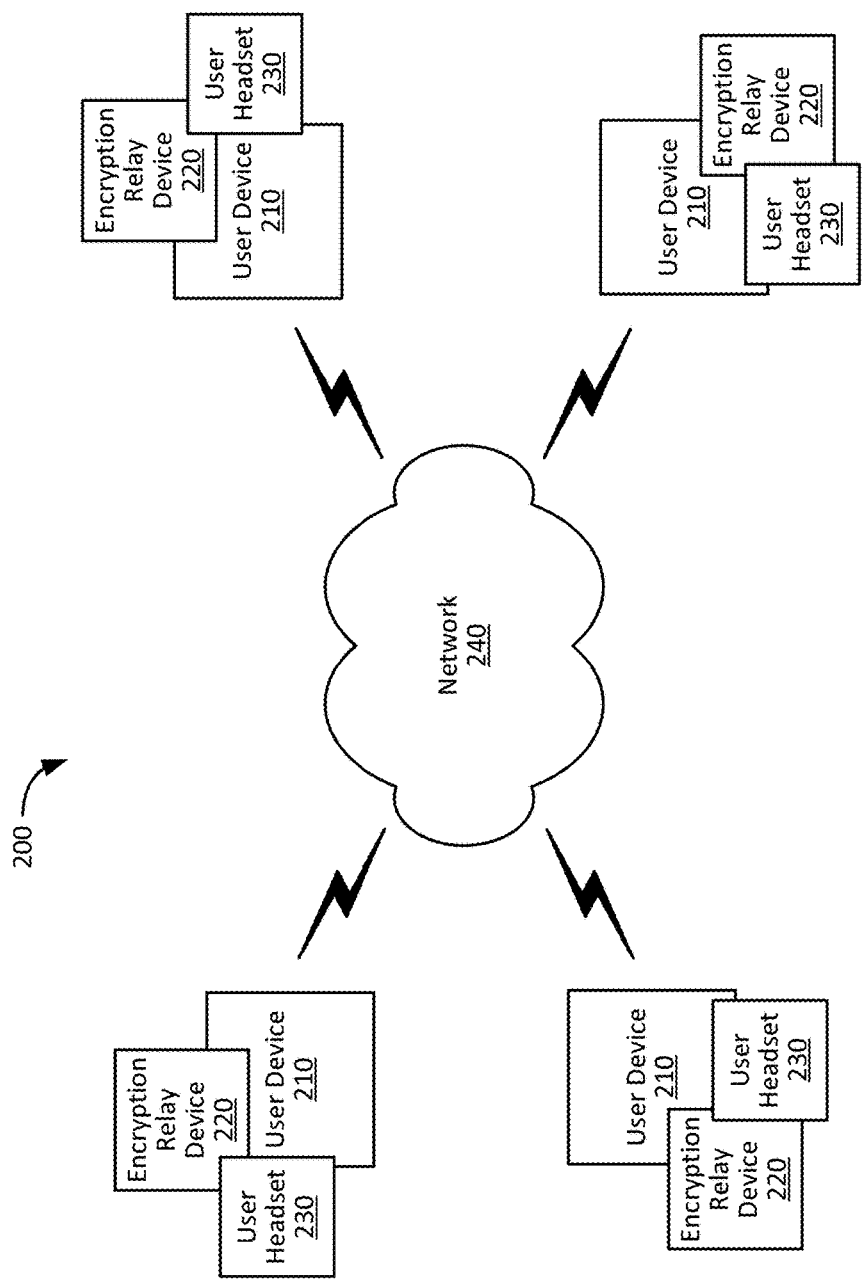
FIG. 2 is a diagram of an example environment in which systems and/or methods described herein may be implemented.

FIG. 2 is a diagram of an example environment 200 in which systems and/or methods described herein may be implemented. Environment 200 may include user devices 210, encryption relay devices 220, user headsets 230, and network 240.

User device 210 may include a portable computing and communication device, such as a personal digital assistant (PDA), a smart phone, a cellular phone, a laptop computer with connectivity to a wireless telecommunications network, a tablet computer, etc. User device 210 may connect, through a radio link, to network 240. User device 210 may communicate with encryption relay device 230 via a wired or wireless connection.

Encryption relay device 230 may include a computing and communication device that relays information between user device 210 and user headset 230. Encryption relay device 230 may communicate to user device 210 and/or user headset 230 wirelessly, via Bluetooth™ or another wireless protocol. In some implementations, encryption relay device 220 may include one interface for communicating with user device 210 and another interface for communicating with headset 230. Encryption relay device 230 may encrypt information going from headset 230 to user device 210, and decrypt information going from user device 210 to headset 230. Encryption relay device 230 may also engage (with other encryption relay devices 230) in several security key exchange operations that are described below in greater detail.

As described in detail with reference to FIGS. 5 and 6, encryption relay device 220 may include a manufacturer public key. The manufacturer public key may include a manufacturer-burned serial number that cannot be changed. The manufacturer public key may be the same for all encryption relay devices 220 produced by a particular manufacturer (or for a particular vendor). The manufacturer public key may be uploaded to a directory, such as a Web of Trust (WoT), a Pretty Good Privacy (PGP) system, etc., and used by one encryption relay device 220 to verify the identity of another encryption relay device 220 during a key negotiation procedure.

User headset 230 may include a computing and communication device that may connect with encryption relay device 220. User headset 230 may communicate with encryption relay device 220 via a wireless or wired connection. In some implementations, user headset 230 may include a microphone and speaker system that enables a user to participate in telephone calls. In some implementations, user headset 230 may be another type of auxiliary device for user device 210, such as a wearable device like a watch, a clip on device, glasses, etc.

Network 240 may include one or more wired and/or wireless networks. For example, network 240 may include a cellular network (e.g., a second generation (2G) network, a third generation (3G) network, a fourth generation (4G) network, a fifth generation (5G) network, a LTE network, a GSM network, a code division multiple access (CDMA) network, an evolution-data optimized (EVDO) network, or the like), a public land mobile network (PLMN), and/or another network. Additionally, or alternatively, network 240 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
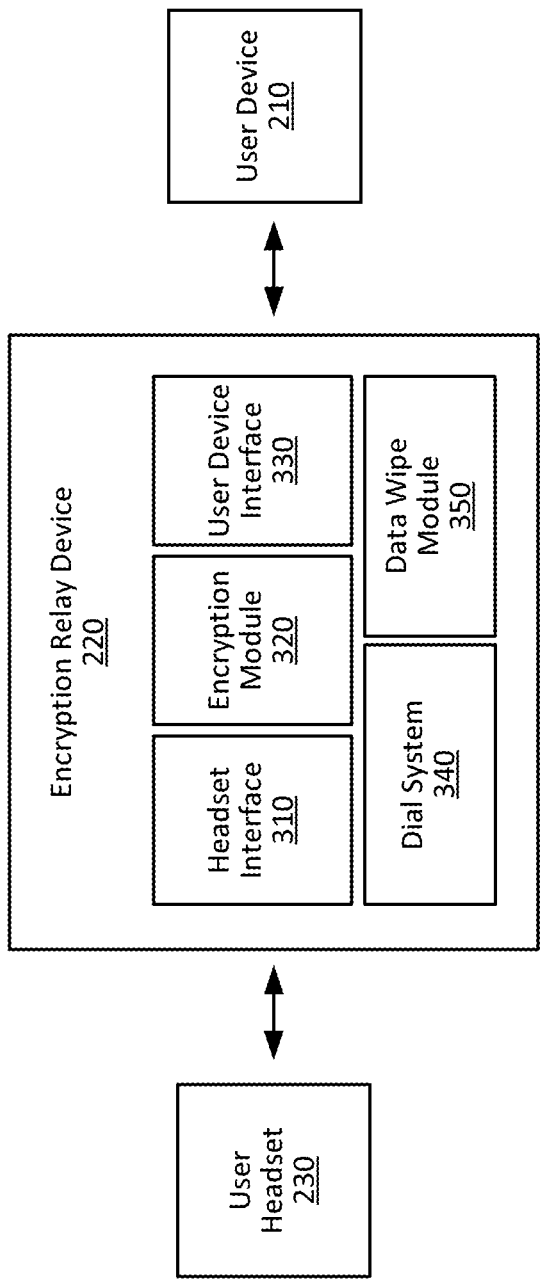
FIG. 3 is a block diagram of an example encryption relay device.

FIG. 3 is a block diagram of an example encryption relay device 220. As shown, encryption relay device 220 may include headset interface 310, encryption module 320, user device interface 330, dial system 340, and data wipe module 350. Encryption relay device 220 may be implemented in a variety of ways, which may include computer hardware, electronic circuitry, software, or a combination of computer hardware and software.

Headset interface 310 may include a wired or wireless communication interface that enables encryption relay device 220 to communicate with user headset 230. Headset interface 310 may communicate via a wireless protocol, such as Bluetooth™. Alternatively, headset interface 310 may communicate via a wired interface, such as a 3.5 millimeter (mm) jack. In some implementations, headset interface 310 may include both a wireless interface (e.g., Bluetooth) and a wired interface (e.g., a 3.5 mm jack). A user may then use whichever interface is appropriate for the type of headset that is being used.

Encryption module 320 may act to encrypt and decrypt information passing through encryption relay device 220. Encryption module 320 may implement a variety of cryptography techniques that may involve public and private keys, manufacturer keys, identification certificates, timestamps, random values, and hash functions. Examples of cryptography techniques that may be used may include Advanced Encryption Standard (AES) technology, such as AES 256 Cipher Block Chaining (CBC)) or another suitable encryption methodology.

In some implementations, initialization of an encrypted communication session may be performed using audible signals that are transmitted as part of the normal telephone call. For example, encryption module 320 may generate a high-frequency audio signal (e.g., a "chirp") that is to be embedded as part of the voice call. The audio signal may be in the ultrasonic range so that the users involved in the call do not hear the audio signal. The high-frequency audio signal may contain an encoded identifier and a payload to initiate a key exchange with the other encryption relay device 220 involved in the call. For example, the high-frequency audio signal may be used to initiate and perform a Diffie-Hellman key exchange through which two encryption relay devices 220 agree upon a symmetric encryption key that is used to encrypt subsequent communications between the two encryption relay devices. Implementing a high-frequency audio signal in this manner may help deter a man-in-the-middle attack regarding the call because it would be too difficult for the man-in-the-middle device to perform real-time processing of the network audio traffic to implement the man-in-the-middle attack.

User device interface 330 may include a wired or wireless communication interface that enables encryption relay device 220 to communicate with user device 210. User device interface 330 may communicate via a wireless protocol, such as Bluetooth™. Alternatively, user device interface 330 may communicate via a wired interface, such as a 3.5 millimeter (mm) jack.

Dial system 340 may include a physically programmable security key that can be used in the call encryption operations described herein. For instance, dial system 240 may include a series of physical dials, levers, or buttons that can be set to specific values or arranged in a way that defines a security key that can be used to negotiate security key exchanges.

Data wipe module 350 may enable encryption relay device 220 to clear information (e.g., security keys, certificates, authentications, etc.) that may have been used by encryption relay device 220. In some implementations, encryption relay device 220 may clear information in response to one or more triggers, such as after each telephone call, based on a pre-selected schedule, in response to a request from a user (e.g., the user pressing an erase button on encryption relay device 220), after the data has been stored for a selected period of time, etc. In some implementations, data wipe module 350 may clear information from encryption relay device 220 in response to detecting tampering or physical trauma to encryption relay device 220. For instance, encryption relay device 220 may include one or more sensors capable of detecting attempts to physically open and/or modify encryption relay device 220 (e.g., by installing recording, wire-tapping, or other types of monitoring devices within encryption relay device 220). In response to such attempts, encryption relay device 220 may automatically delete usage and encryption information stored by encryption relay device 220. In some implementations, after information has been cleared, a user may use dial system 340 to manually set a new encryption key. Additionally, a chassis or physical exterior of encryption relay device 220 may be transparent so that unwanted tampering or modifications of encryption relay device 220 can be more readily detected.

Figure 4A:
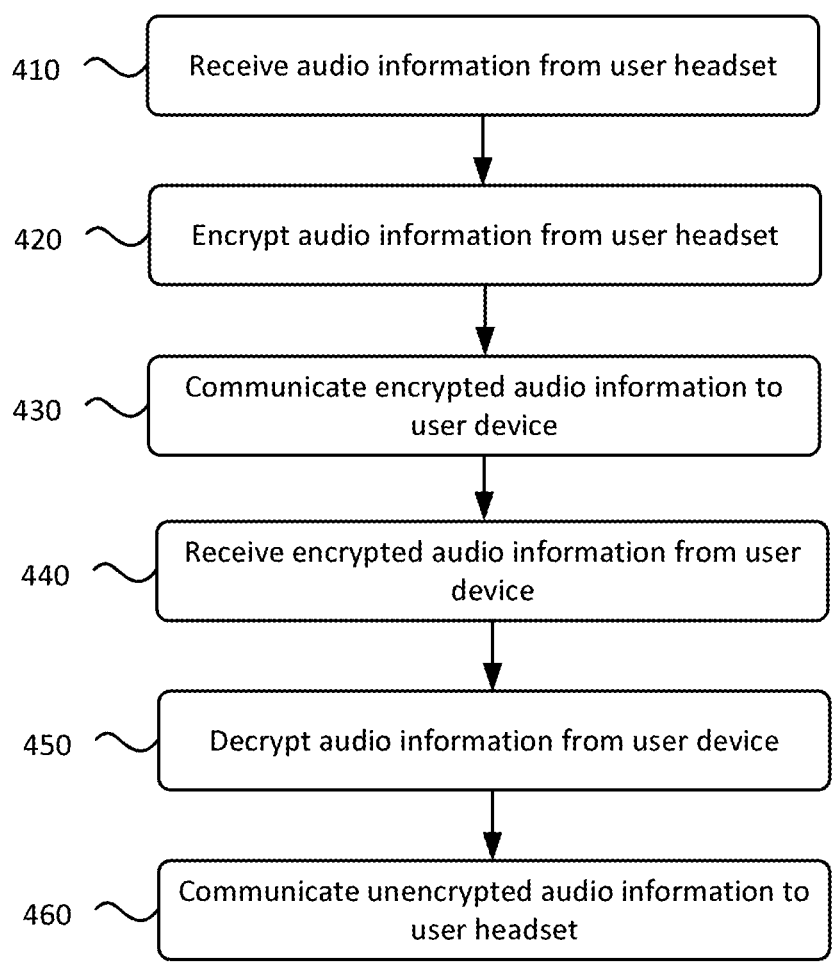
FIG. 4A is a flow chart illustrating an example process for encrypting and decrypting a call.

FIG. 4A is a flow chart illustrating an example process 400A for encrypting and decrypting a call. Process 400A may be implemented by encryption relay device 220. Process 400A is described below in terms of audio information (e.g., a call); however, the operations of process 400A may be applied to audio information (or calls) transmitted along with other (or additional) types of information, such as images and videos. For instance, a call, as described herein, may include a telephone call, a call involving video (e.g., a call using FaceTime™, a call using Skype™, etc.), a call involving images, etc. Additionally, process 400A may include additional or alternative operations than those shown in FIG. 4A. For instance, process 400A may include one or more operations for exchanging security keys prior to encrypting and decrypting telephone call information. As such, process 400A may be consistent with a scenario where two encryption relay devices 220 have already exchanged encryption keys.

As shown, process 400A may include receiving audio information from user headset 230 (block 410). For example, encryption relay device 220 may receive audio information from user headset 230 via a wired or wireless connection. For instance, encryption relay device 220 may connect to user headset 230 via a Bluetooth pairing process. Alternatively, encryption relay device 220 may connect to user headset 230 via, for example, a 3.5 millimeter jack and connector. In some implementations, the audio information may primarily include the voice of a user speaking into user headset 230; however, additional types of information may also be received.

Process 400A may include encrypting the audio information from user headset 230 (block 420). For example, encryption relay device 220 may encrypt the audio information using one or more encryption techniques. Examples of such techniques may include an AES technology, such as AES 256 CBC, or another suitable encryption methodology.

Process 400A may include communicating encrypted audio information to user device 210 (block 430). For example, encryption relay device 220 may transmit newly encrypted audio information from user headset 230 to user device 210. In some implementations, encryption relay device 220 may use a completely different communication interface to communicate with user device 210 than to communicate with user headset 230 (e.g., two separate Bluetooth™ interfaces, one Bluetooth™ interface and one wired interface, two separate wired interfaces, etc.).

Process 400A may include receiving encrypted audio information from user device 210 (block 440). For example, encryption relay device 220 may receive information that has been encrypted by an encryption relay device 220 of another user device 210 (e.g., the other user device 210 involved in the call). The encrypted audio information may be received by encryption relay device 220 via the same communication interface used to communicate encrypted audio information to user device 210 (See, block 430).

Process 400A may include decrypting the audio information received from user device 210 (block 450). For example, encryption relay device 220 may convert the encrypted audio information to a non-encrypted form so that the audio information may be understood by the user. As such, the information received may have been encrypted using keys and cryptographic techniques known to encryption relay device 220 via previously executed security key exchange operations.

Process 400A may include communicating unencrypted audio information to user headset 230 (block 460). For example, encryption relay device 220 may transmit the newly unencrypted information to user headset 230 via a Bluetooth™ connection or another type of connection. The unencrypted information may be of the same quality and integrity that the user would have experienced had the information not gone through any cryptographic operations.

FIG. 4B is a flow chart illustrating an example process 400B for encrypting and decrypting a call using encryption relay devices 220. Process 400B may be implemented by encryption relay device 220.

As shown, process 400B may include pairing to user headset 230 and user device 210 (block 415). For instance, encryption relay device 220 may establish a connection with user headset 230 and user device 210. As stated above, the connection may be a wired connection (e.g., via a 3.5 millimeter jack) or a wireless connection (e.g., via Bluetooth™).

Process 400B may also include deleting stored encryption settings (block 425). For example, encryption relay device 220 may delete one or more encryption settings (e.g., a user public key, a user private key, a previously used symmetric encryption key, etc.) in response to one or more events. For instance, encryption relay device 220 may include a button, or another type of interface object, that allows a user to input a command for encryption relay device 220 to delete encryption keys stored by encryption relay device 220. As another example, encryption relay device 220 may delete the encryption settings in response to detecting an attempt to modify or tamper with encryption relay device 220 (e.g., by reconfiguring existing hardware or software, installing new hardware or software, etc.). In some implementations, encryption relay device 220 may enter into a lockdown mode after deleting information in response to tampering. The lockdown mode may render encryption relay device 220 inoperable, and may be temporary or permanent.

Process 400B may also include receiving new encryption settings (block 435). For example, encryption relay device 220 may receive new encryption settings directly from a user. As discussed above, encryption relay device 220 may include one or more buttons, dials, or other types of interface objects that enable a user to specify an encryption key for encryption relay device 220. In some implementations, encryption relay device 220 may enable the user to input the entire encryption key. In some implementation, encryption relay device 220 may include a series of dials (e.g., 5 dials) that the user may rotate to specify a particular value, and encryption relay device 220 may generate an encryption key based on the positions of the dials (and possibly based on other settings). In some implementations, encryption relay device 220 may receive encryption settings from another source, such as another device. Additionally, encryption relay device 220 may have one or more default settings that may be implemented in the event that overriding encryption settings are not specified.

Process 400B may include initiating a key exchange during a call (block 445). For instance, encryption relay device 220 may negotiate with another encryption relay device 220 regarding encryption keys. The negotiation may be embedded within the audio stream of a verbal communication. In some implementations, the negotiation may take place via high-frequency audio signals (also referred to here as "chirps") that are sent back and forth between encryption relay devices 220. In some implementations, the negotiation may begin right after the call is established, and the high-frequency audio signals may be ultrasonic so that they are not heard by the users.

As one concrete example, a call may be initially established, using encryption relay devices 220, as an unencrypted call. Either automatically, or in response to one of the users pressing a button on encryption relay device 220, the unencrypted call may be converted to an encrypted call. To implement the encrypted call, an encryption key may be exchanged or established between the two encryption relay devices 220. For example, the encryption key may be a key for AES-256-CBC encryption. In one implementation, the encryption key may be negotiated between the two encryption relay devices 220 using audio signals that are embedded within the call. For example, Diffie-Hellman key exchange process may be used to exchange an encryption key for the session. Alternatively or additionally, the physical dials on the relay devices may have been used to manually set the encryption key (e.g., the users may have previously agreed upon settings for the dials).

Process 400B may include encrypting and decrypting call information (block 455). For instance, encryption relay device 220 may encrypt call information originating from a user of encryption relay device 220 and decrypt incoming call information. As discussed below in greater detail with reference to FIGS. 6 and 7, encryption relay device 220 may also implement asymmetric encryption techniques to perform authentication of external encryption relay devices and/or to exchange the symmetric encryption key that is used to encrypt the voice call.

Figure 5:
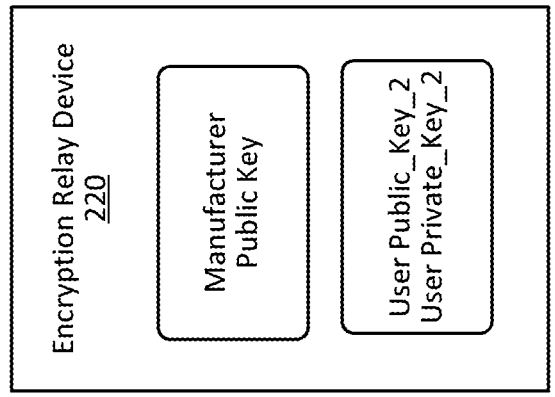
FIG. 5 is a block diagram of example encryption keys used by encryption relay devices.
Figure 5:
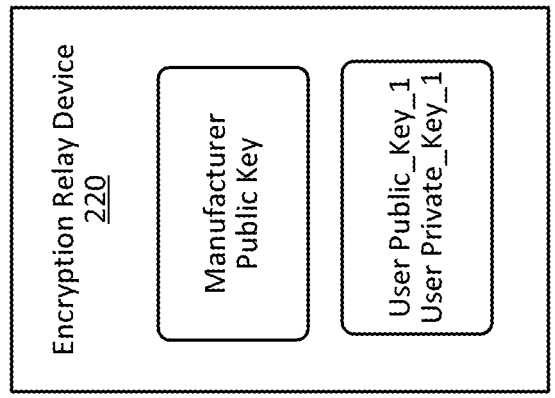

FIG. 5 is a block diagram of example security keys of encryption relay devices 220. As shown, each encryption relay device 220 may include security keys, such as a manufacturer public key, a user public key, and a user private key. The manufacturer public key may include a permanent identifier that is assigned to each encryption relay device 220, such that each encryption relay device 220 has the same manufacturer public key. The manufacturer public key may be assigned to encryption relay device 220 when the encryption relay device 220 is still being manufactured. The user public keys and the user private keys may be part of a cryptographic protocol implemented by encryption relay devices 220 (e.g., asymmetric cryptography) where the public key, which may be derived from the private key, is designated by an accepted authority and the private key is securely stored by the user. As is described below in greater detail, encryption relay devices 220 may use manufacturer public keys, user public keys, and user private keys to negotiate encoding/decoding arrangements that ensure the privacy and security of calls.

Figure 6:
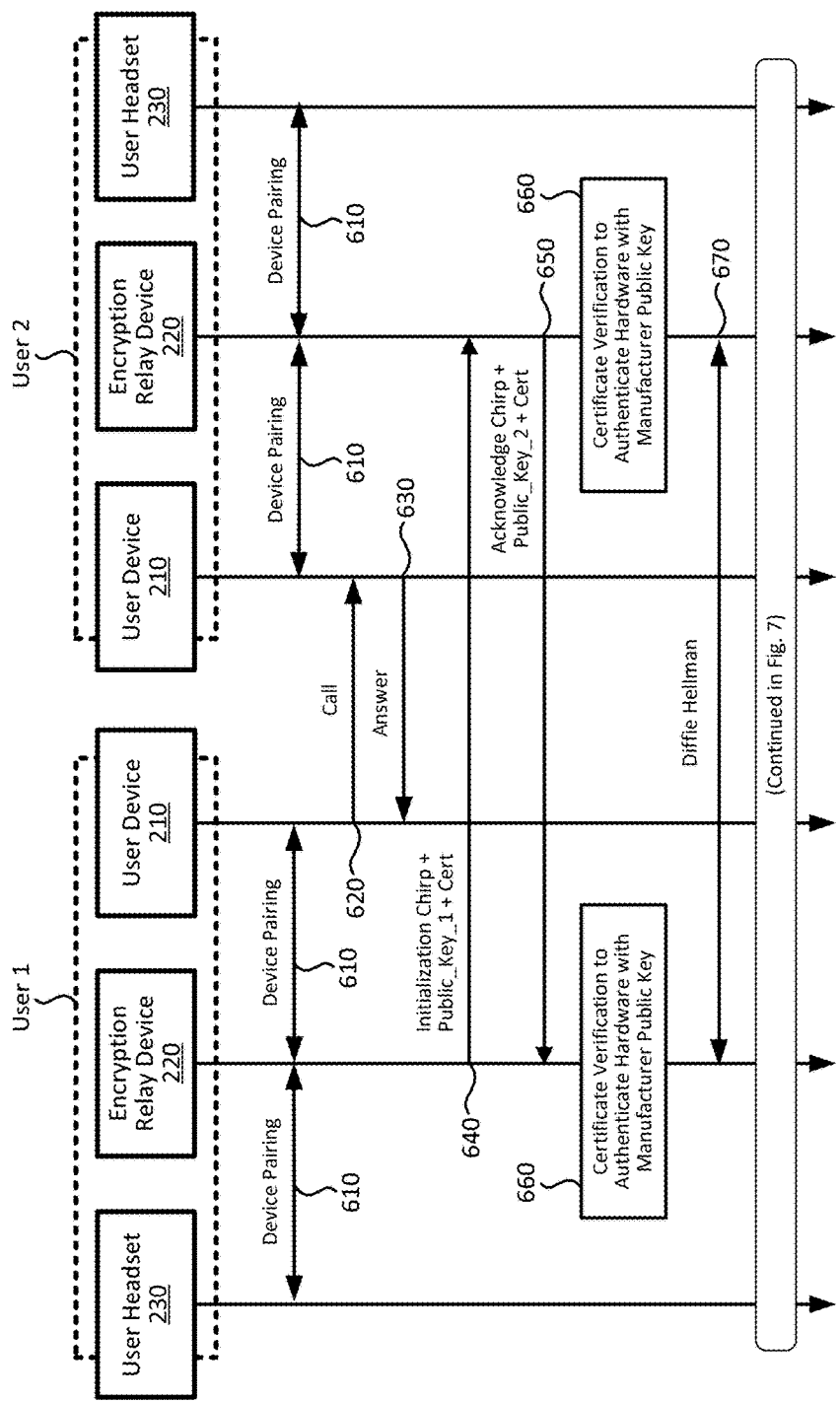
FIGS. 6 and 7 are sequence flow diagrams of an example process for encrypting a call.
Figure 7:
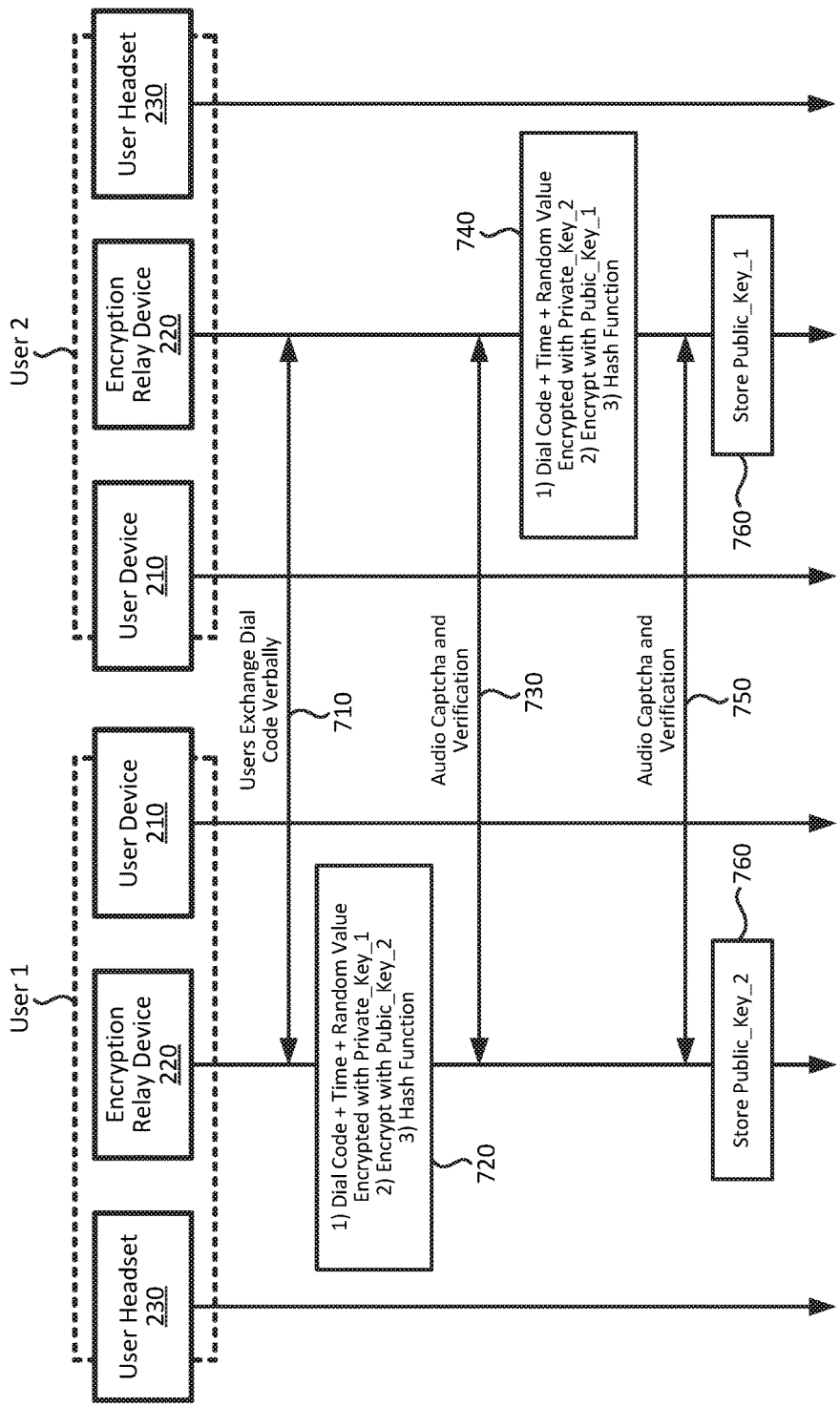

FIGS. 6 and 7 are sequence flow diagrams of an example process for encrypting a call. As shown, the example process involves two users (i.e., User 1 and User 2) that are each associated with user headset 230, encryption relay device 220, and user device 210.

As shown, the process may include device pairing operations where each encryption relay device 220 establishes a connection (e.g., a Bluetooth connection) with a corresponding user device 210 and user headset 230 (lines 610). User 1 may initiate a call to User 2 (line 620) and User 2 may respond by answering the call (line 630).

Encryption relay device 220 of User 1 may send an initialization signal (e.g., a "chirp") that is embedded into the audio stream of the call. The initialization signal may be an ultrasonic signal so that it is not heard by the users. The initialization signal may include information for initiating a key exchange with encryption relay device 220 of User 2. For instance, the initialization signal may include a user public key (e.g., Public_Key_1) and an identity certificate of encryption relay device 220 of User 1 (line 640). The identity certificate may include information that is typical for an identity certificate, such as information about the user public key, information about encryption relay device 220, a digital signature of an entity (e.g., a certificate authority (CA)) that has verified that the certificate's contents are correct, etc. However, the identity certificate may also include the manufacturer public key of encryption relay device 220 of User 1. As described below, the manufacturer public key may be used to authenticate encryption relay device 220 more thoroughly than a typical identity certificate verification procedure. For instance, the manufacturer public key may be used to verify the manufacturer that produced encryption relay device 220 of User 1.

As shown, encryption relay device 220 of User 2 may respond to the initialization signal with an acknowledgement signal (e.g., an acknowledgement "chirp"). Similar to the initialization signal, the acknowledgement signal may be embedded into the audio stream of the call and may be an ultrasonic signal so that it is not heard by the users. Also similar to the initialization signal, the acknowledgement signal may include a user public key (e.g., Public_Key_2 ) and an identity certificate of encryption relay device 220 of User 2 (line 650). The identity certificate may include information about the user public key, information about encryption relay device 220, a digital signature of an entity (e.g., a certificate authority (CA)) that has verified that the certificate's contents are correct, etc. However, the identity certificate may also include the manufacturer public key of encryption relay device 220 of User 2.

Each encryption relay device 220 may perform a certificate verification procedure to authenticate the other encryption relay device 220 involved in the call (blocks 660). The certificate verification procedure may include standardized operations for verifying that a user public key received from a particular device (e.g., encryption relay device 220) actually belongs to the device. However, the certificate verification procedure may also include verifying the manufacturer public key in the identity certificate.

For instance, in implementations where each encryption relay device 220 has been assigned the same manufacturer public key, encryption relay device 220 may verify the manufacturer public key in the identity certificate by determining whether the manufacturer public key in the identity certificate matches a manufacturer public key that is stored locally by the encryption relay device 220. Alternatively, in implementations where each encryption relay device 220 has a different manufacturer public key, verifying the manufacturer public key in the identity certificate may include validating the manufacturer public key by communicating with an external directory that stores manufacturer public keys, such as a WoT or PGP system. Using the manufacturer public key in this manner may help protect against man-in-the-middle attacks by verifying that the identity certificate originated from an encryption relay device 220 that was produced by a particular, or otherwise trusted, manufacturer.

Additionally, encryption relay devices 220 may agree upon a symmetric encryption key, for the substantive encryption of the voice call, using a Diffie-Hellman technique or another secure method of exchanging an encryption security key (line 670). Using symmetric key encryption, as opposed to asymmetric key encryption, may enable encryption relay devices 220 to encrypt and decrypt the voice call in a manner that reduces the processing capacity often required for asymmetric encryption. As such, asymmetric encryption techniques may be used to verify the identities of each encryption relay devices 220, and symmetric encryption techniques may be used to actually encrypt and decrypt the verbal communication. Once encryption is resolved between encryption relay devices 220, user devices 210, encryption relay devices 220, and user headsets 230 may provide User 1 and User 2 with a secure, encrypted call in the manner described herein (See, e.g., FIGS. 1 and 4).

Referring now to FIG. 7, at some point during the call, User 1 and User 2 may decide to begin using a different encryption key. For instance, User 1 and User 2 may become concerned about the potential for a man-in-the-middle device listening to their conversation and may decide to begin using a different encryption key. As such, User 1 and User 2 may press a button on each encryption relay device 220 to activate data wipe module 350 and delete current cryptographic settings stored by each encryption relay device 220. Additionally, User 1 and User 2 may verbally agree (during the call) on a new encryption key (e.g., dial code) that they manually program into each encryption relay device 220 using dial system 340 (See, e.g., FIG. 3) (line 710). In such a scenario, encryption relay devices 220 may use the manually programmed encryption key (or an encryption key derived from the manual inputs of User 1 and User 2) to encrypt and decrypt the call going forward.

Additionally, encryption relay devices 220 may perform a series of operations to conduct an audio CAPTCHA (Completely Automated Public Turing test to tell Computers and Humans Apart) procedures to determine, for example, whether there is a man-in-the-middle device listening to the call. As shown, encryption relay device 220 of User 1 may create information for conducting the audio CAPTCHA procedure (block 720). The information may include the new security key, the current time (e.g., a timestamp), and a random value that has been encrypted with Private_Key_1.

The new security key may provide a new sequence of values that are known to both encryption relay devices 220, such that any modification of the sequence of values during the audio CAPTCHA procedure could indicate to either encryption relay device 220 that, for example, someone or something has tampered with the information. The current time may be used to track how long it takes for the information to go from one encryption relay device 220 to the other encryption relay device 220 (e.g., an extended period of time may be indicative of a man-in-the-middle device decrypting, recording, and re-encrypting the information). The random value encrypted with Private_Key_1 may enable encryption relay device 220 of User 1 to uniquely identify and track the information used in the audio CAPTCHA procedure.

Additionally, the information (e.g., the new security key, the current time, and the encrypted random value) may be encrypted using Public_Key_2. Encrypting the new security key and the current time using Public_Key_2 may provide security but still enable encryption relay device 220 of User 2 to participate in the audio CAPTCHA procedure by, for example, verifying that the new security key has not been modified and using the timestamp to determine how long the information took to travel between encryption relay devices 220. A hashing function may also be applied to the information in order to, for example, further bolster security. For instance, in the event that Public_Key_2 was compromised to a third-party, using a hashing function that is known to both encryption relay devices 220 may help ensure that the audio CAPTCHA procedure and the information used in the audio CAPTCHA procedure will not be compromised as well.

Encryption relay devices 220 may perform an audio CAPTCHA procedure based on the information produced by encryption relay device 220 of User 1 (line 730). In some implementations, the audio CAPTCHA procedure may include causing audio information (e.g., a random sequence of words, letters, numbers, etc.), from one encryption relay device 220, to be played back to a user of another encryption relay device 220 and requesting that the user try to interpret and repeat what the audio information is trying to communicate. The audio information may be provided at such low quality that it can only be understood by a user and not, for example, by a man-in-the-middle device. The user's attempt to repeat the audio information may be sent back to encryption relay device 220 that initiated the procedure to determine whether the information from the user is correct.

The determination of whether the user's interpretation was correct may be made by the user initiating the audio CAPTCHA procedure or the encryption relay device 220 of the user initiating the audio CAPTCHA procedure. For instance, encryption relay device 220 of User 1 may initiate the audio CAPTCHA procedure, which may cause encryption relay device 220 of User 2 to playback low quality audio information to User 2 with a request that User 2 attempt to interpret what the audio information is trying to convey. The input from User 2 may be relayed back to encryption relay device 220 of User 1 and both the low quality audio information provided to User 2, and User 2's interpretation of the audio information, may be played back to User 1. User 1 may then provide an input to encryption relay device 220 of User 1 as to whether User 2's interpretation is correct. In other implementations, the determination of whether User 2's interpretation is correct may be handled automatically by encryption relay device 220 of User 1.

Encryption relay device 220 of User 2 may also produce information for an audio CAPTCHA procedure (block 740). Similar to the audio CAPTCHA procedure initiated by User 1, the information produced by encryption relay device 220 of User 2 may include the new security key (e.g., dial code), the current time, and a random value encrypted Private_Key_2. The information may be encrypted using Public_Key_1, and a hashing function may be applied to further enhance security. Encryption relay devices 220 may again perform an audio CAPTCHA procedure (line 750) similar to the audio CAPTCHA procedure described above with reference to line 730. As such, an audio CAPTCHA procedure may be performed by both encryption relay devices 220 to better ensure the privacy and security of the call. Additionally, each encryption relay device 220 may continue to store the public key of the other encryption relay device 220 (blocks 760) if, for example, the users again decide to use a new security key. In this manner, encryption relay devices 220 may engage in security key exchange operations that enable the encryption and decryption of telephone calls and provide various tests to verify whether the call is being listened to by a third-party.

FIG. 8 is a diagram of example components of a device 800. Each of the devices illustrated in FIGS. 1-3 and 5-7 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with regard to FIGS. 4A, 4B, and 6-7, the order of the blocks may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an application-specific integrated circuit (ASIC) or a field-programmable gate array (FPGA), or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   detecting, by an encryption relay device, a call associated with a user device that is in communication with the encryption relay device, the call further being associated with another user device that is in communication with another encryption relay device;
   authenticating, by the encryption relay device, the other encryption relay device, the authenticating including:
      sending audio Completely Automated Public Turing test to tell Computers and Humans Apart (CAPTCHA) information to the other encryption relay device;
      receiving, from the other encryption relay device, an audio response to the audio CAPTCHA information;
      presenting, to the user device, the received audio response;
      receiving, from the user device, confirmation that the received audio response matches the audio CAPTCHA information; and
      authenticating the other encryption relay device based on receiving the confirmation;
   inserting, by the encryption relay device, audio signals within the call, the audio signals encoding information used to perform a key exchange with another encryption relay device, to exchange one or more encryption keys for the call,
      wherein at least one encryption key, of the one or more encryption keys, is based on a dial code physically programmed by a user of the user device;
   storing, in a local memory of the encryption relay device, the at least one encryption key;
   receiving, by the encryption relay device and from the user device, encrypted incoming call information corresponding to the call;
   decrypting, by the encryption relay device, the encrypted incoming call information based on the one or more encryption keys, to obtain a decrypted version of the incoming call information;
   outputting the decrypted version of the incoming call information to an external communication device that is communicatively coupled to the encryption relay device;
   receiving, by the encryption relay device and from the external communication device, outgoing call information;
   encrypting, by the encryption relay device and based on the one or more encryption keys, the received outgoing call information;

communicating, by the encryption relay device, the encrypted outgoing call information to the user device to relay the outgoing encrypted call information as part of the call;

detecting, by the encryption relay device, that the call has ended; and in response to detecting that the call has ended, automatically erasing the at least one encryption key from the local memory of the encryption relay device.

2. The method of claim 1, wherein:

the encryption relay device is connected to the user device via a first short-range wireless interface, and the encryption relay device is connected to the external communication device via a second short-range wireless interface, wherein the external communication device includes a headset.

3. The method of claim 1, further comprising:

generating the at least one encryption key based on a physical arrangement of manually programmable features of the encryption relay device.

4. The method of claim 1, further comprising:

receiving call information, originating from the other user device, that includes a timestamp;

determining a duration of time defined by a difference between the timestamp and a current time; and determining whether a third-party device is participating in the call based on the duration of time.

5. The method of claim 1, detecting an identity certificate encoded in an audio signal of the call; and authenticating the other encryption relay device further based on the identity certificate.

6. The method of claim 1, further comprising:

performing a Diffie Hellman procedure to determine a symmetric encryption key between the encryption relay device and the other encryption relay device.

7. The method of claim 1, wherein the audio signals within the call are ultrasonic audio signals.

8. The method of claim 1, wherein presenting the audio response to the user device allows the user device to audibly present, via an audio output device of the user device, the audio response to a user of the user device.

9. A non-transitory computer readable medium containing program instructions for causing one or more processors to:

detect a call associated with a user device, in communication with an encryption relay device, the call further being associated with another user device that is in communication with another encryption relay device;

authenticate the other encryption relay device, the authenticating including:

sending an audible phrase to the other encryption relay device;

receiving, from the other encryption relay device, an audio response to the audible phrase;

presenting, to the user device, the received audio response;

receiving, from the user device, confirmation that the received audio response matches the audible phrase sent to the other encryption relay device; and authenticating the other encryption relay device based on receiving the confirmation;

insert audio signals within the call, the audio signals encoding information used to perform a key exchange with another encryption relay device, to exchange one or more encryption keys for the call, wherein at least one encryption key, of the one or more encryption keys, is based on a dial code physically inputted at the user device;

store, in a local memory of the encryption relay device, the at least one encryption key;

receive, from the user device, encrypted incoming call information corresponding to the call;

decrypt the encrypted incoming call information based on the one or more encryption keys, to obtain a decrypted version of the incoming call information;

output the decrypted version of the incoming call information to an external communication device that is communicatively coupled to the encryption relay device;

receive, from the external communication device, outgoing call information;

encrypt, based on the one or more encryption keys, the received outgoing call information;

communicate the encrypted outgoing call information to the user device to relay the outgoing encrypted call information as part of the call;

detect that the call has ended; and in response to detecting that the call has ended, automatically erase the at least one encryption key from the local memory of the encryption relay device.

10. The non-transitory computer readable medium of claim 9, wherein:

the encryption relay device is connected to the user device via a first short-range wireless interface, and the encryption relay device is connected to the external communication via a second short-range wireless interface, wherein the external communication device includes a headset.

11. The non-transitory computer readable medium of claim 9, wherein the program instructions cause the one or more processors to:

generate the at least one encryption key based on a physical arrangement of manually programmable features of the encryption relay device.

12. The non-transitory computer readable medium of claim 9, wherein the program instructions cause the one or more processors to:

receive call information, originating from the other user device, that includes a timestamp;

determine a duration of time defined by a difference between the timestamp and a current time; and determine whether a third-party device is participating in the call based on the duration of time.

13. The non-transitory computer readable medium of claim 9, wherein the program instructions cause the one or more processors to:

detect an identity certificate encoded in an audio signal of the call; and authenticate the other encryption relay device further based on the identity certificate.

14. The non-transitory computer readable medium of claim 9, wherein the program instructions cause the one or more processors to:

performing a Diffie Hellman procedure to determine a symmetric encryption key between the encryption relay device and the other encryption relay device.

15. The non-transitory computer readable medium of claim 9, wherein the audible phrase includes audio Completely Automated Public Turing test to tell Computers and Humans Apart (CAPTCHA) information.

16. A computing device comprising:
a non-transitory computer-readable memory device storing processor-executable instructions; and
one or more processors configured to execute processor-executable instructions to cause the one or more processors to:
   detect a call involving a user device in communication with the computing device, the call further being associated with another user device that is in communication with an encryption relay device;
   authenticate the encryption relay device, the authenticating including:
      sending an audible phrase to the encryption relay device;
      receiving, from the encryption relay device, an audio response to the audible phrase;
      presenting, to the user device, the received audio response;
      receiving, from the user device, confirmation that the received audio response matches the audible phrase sent to the encryption relay device; and
      authenticating the encryption relay device based on receiving the confirmation;
   insert audio signals within the call, the audio signals encoding information used to perform a key exchange, to exchange one or more encryption keys for the call,
      wherein at least one encryption key, of the one or more encryption keys, is based on a code dialed at the user device;
   store, in a local memory of the computing device, the at least one encryption key;
   receive, from the user device, encrypted incoming call information corresponding to the call;
   decrypt the encrypted incoming call information based on the one or more encryption keys, to obtain a decrypted version of the incoming call information;
   output the decrypted version of the incoming call information to an external communication device that is communicatively coupled to the computing device;
   receive, from the external communication device, outgoing call information;
   encrypt the received outgoing call information, based on the one or more encryption keys;
   communicate the encrypted outgoing call information, to the user device to relay the outgoing encrypted call information as part of the call;
   detect that the call has ended; and
   in response to detecting that the call has ended, automatically erase the at least one encryption key from the local memory of the computing device.

17. The computing device of claim 16, wherein the instructions cause the one or more processors to:
   use a first short-range wireless interface to communicate with the user device, and
   use a second short-range wireless interface to communicate with the external communication device, wherein the external communication device includes a headset.

18. The computing device of claim 16, wherein the audible phrase includes audio Completely Automated Public Turing test to tell Computers and Humans Apart (CAPTCHA) information.

19. The computing device of claim 16, wherein the processor-executable instructions further include processor-executable instructions to:
   determine when an attempt is made to physically tamper with the computing device; and
   automatically erase the one or more encryption keys from the local memory of the computing device when determining that an attempt has been made to physically tamper with the computing device.

20. The computing device of claim 16, wherein the processor-executable instructions further include processor-executable instructions to:
   detect an expiration of a pre-selected period of time for storing the one or more encryption keys; and
   automatically erase the one or more encryption keys from the local memory of the computing device when detecting the expiration of the pre-selected period of time for storing the one or more encryption keys.

* * * * *